Patented Apr. 29, 1952

2,594,601

UNITED STATES PATENT OFFICE 2,594,601

SUBSTANTIALLY INFUSIBLE NITROGENOUS RESINS AND METHOD OF PRODUCING SAME

George Karl Vogelsang, La Mott, Pa., assignor to The Borden Company, New York, N. Y., a corporation of New Jersey No Drawing. Application May 12, 1949,
Serial No. 92,950

12 Claims. (Cl. 260—43)

The present invention relates to a novel type of nitrogenous resin and in particular to one from which the water soluble constituents have been removed, and to a method for producing such a resin.

The prime object of the present invention is to provide a new type of nitrogenous resin, particularly one which is derived from relatively abundant and cheap raw materials and intermediaries, which is substantially infusible and which may be appropriately modified by the inclusion therein of subsidiary substances so as to control its physical properties, and particularly the properties which it exhibits during the molding operation.

Another object of the present invention is to devise a method for the production of such a novel type of nitrogenous resin.

A further object is to provide a class of nitrogenous resins which are substantially water insoluble and which may have their physical properties controlled by the addition thereto of various modifying substances which are also water insoluble, thus permitting the property, for example, of moldability to be controlled to any desired degree without impairing the water resistance of the ultimate cured article.

A more specific object of the present invention is to produce a new nitrogenous resin by reacting a potentially reactive phenol-aldehyde condensation product with certain novel reactive amines and in leaching the reaction product with water so as to remove the water insoluble constituents of the resin.

The complex chemistry of the reactive amines utilized in carrying out the present invention and of the resins which form the subject matter of the present invention are currently too imperfectly understood to permit of assigning characteristic structural formulae to these materials. Consequently, in defining these condensation products it is necessary to characterize them in terms of their derivation and in terms of their known and inherent physical and chemical attributes.

In copending application, Serial No. 22,726, filed April 22, 1948, by Emil E. Novotny and George Karl Vogelsang and entitled "Reactive Amines," there is described a novel class of reactive amines which may be broadly designated as amino-ketone-aldehyde condensation products which will be referred to hereinafter as "amino KARs." These products are substantially non-resinous. It has been discovered that when these non-resinous products are reacted under suitable conditions with potentially reactive phenol-aldehyde condensation products, novel resins are formed having very desirable characteristics. It is these resins, derivatives of the reactive amines of the aforesaid application, Serial No. 22,726, to which my copending application, Serial No. 55,829, filed October 21, 1948, and now U. S. Patent 2,576,735, issued November 27, 1951 entitled "Nitrogenous Resins," is directed.

I have found that when a nitrogenous resin of the aforesaid application, Ser. No. 55,829, hereinafter referred to as the "primary resin," has its water soluble components removed therefrom, as by water washing, either during or after the formation of the resin, not only is the resultant product water insoluble, an expected result, but it is also substantially infusible, a wholly unexpected result. If selected softening agents, plasticizers, and modifying agents be then added to this infusible product, compositions are produced which are susceptible of use in ways and for purposes for which the resins of application, Ser. No. 55,829, are either not well suited or wholly inoperative.

The process of water washing for the removal of water soluble components from resins is not new, but such a process does not usually produce a substantially infusible resultant product. The reason why such a product is produced when the primary resin here disclosed has its water soluble components removed therefrom is not known. It seems likely that in said primary resin it is the very water soluble components which function in the capacity of solvents or fluxing agents for the water insoluble components thereof, and when these water soluble components are removed, the insoluble components which remain exhibit their normal substantially infusible characteristic. This explanation is, however, mere surmise, and it may well be that the step of water soluble component removal has a subsidiary effect upon the insoluble resin which accentuates its normal tendency toward infusibility. Whatever the true explanation, the production of a substantially infusible resin from a readily fusible one merely by removing the water soluble components of the readily fusible resin is unusual and gives rise to numerous new uses for the resin produced thereby.

The first step in the production of the infusible nitrogenous resins of the present invention is to form the primary resin. Briefly stated, this is done by starting with an "amino KAR," which may be defined as a fusible, soluble, substantially non-resinous and substantially non-volatile reactive amine resulting from the reaction between a ketone-aldehyde condensation product and a nitrogenous base, said ketone-aldehyde condensation product being selected from the class consisting of the fusible, soluble, substantially non-resinous and substantially non-volatile reactive condensation products produced by reacting a ketone having the general formula $CH_3$—CO—R', wherein R' represents an aliphatic hydrocarbon radical having from one to four carbon atoms, with an aldehyde having the general formula R"—CHO, wherein R" represents a member selected from the group consisting of hydrogen and aliphatic hydrocarbon radicals having from one to four carbon atoms, said nitrogenous base being a member of the group consisting of ammonia, primary and secondary amines, and tetra-alkyl ammonium bases which can break down to yield primary or secondary amines, possessing an ionization constant of not less than $1 \times 10^{-8}$ and containing at least one reactive hydrogen atom attached to a basic nitrogen atom, and reacting said "amino KAR" with a potentially reactive type of phenol-aldehyde condensation product.

A substance is "non-resinous," as the term is here used in the specification and claims, if it has the simultaneous properties of being distillable without decomposition and procurable in crystalline form.

The term "potentially reactive" relates to the characteristic common to some phenol-aldehyde condensation products of being convertible to the infusible, insoluble, and thermorigid state (the so-called "C" stage) upon long standing at ordinary temperatures or rapidly under the influence of heat. Potentially reactive phenol-aldehyde condensation products are to be distinguished from such condensation products of the "novalak" type which require the action of curing or hardening agents to procure "C" state resins.

The thus produced primary resin may then be pulverized and subjected to a step which causes removal of the water soluble constituents thereof. One of the most convenient methods for attaining this result is to leach out the water soluble constituents by means of water. Thereafter, the resultant damp and more or less water soaked resin may be dried in an appropriate oven or otherwise processed.

The above paragraph describes a two-step method for the production of resins of the present invention. It will be borne in mind, however, as pointed out in Examples 1 and 2 hereafter, that a one-step method may be employed in which the water washing is carried out simultaneously with the formation of the primary resin. As a general rule, the two-step method is preferred inasmuch as the one-step process is subject to several disadvantages, particularly from a production point of view. Owing to the substantially infusible nature of the washed resin it is generally necessary to include a "fluxing agent" to expedite the removal of the resin from the kettle.

The water washing step may be carried out with water at temperatures between 32° F. and 250° F., although the easily procured temperature range between 70° and 120° F. has been found eminently satisfactory. Adequate quantities of water must be employed but it will be understood that many variations may be made with respect to the quantity of water used per unit resin, the temperature of the water employed, the length of time the water is in contact with the resin, the amount of agitation employed, and the method of separating the water containing the water solubles from the resin (as via a centrifuge or a filter), all as is well within the skill of those versed in the art. The extraction may be carried out batch-wise or via a conventional counter-current technique, which latter is generally preferred because of its increased efficiency. When operating batch-wise, the quantity of water employed may range between two and ten times the weight of the resin, depending upon how thoroughly one wants to free the resin of its water soluble constituents. When operating in a counter-current manner, it generally is sufficient to employ a quantity of water equal to two or three times the weight of the resin.

After the water leaching operation has been completed, the water and the water soluble constituents that have been extracted from the resin may be discarded or the valuable organic material that it contains may be recovered. It has been found desirable to concentrate the aqueous extract to a solids content in the neighborhood of from 60% to 80% and, if the resultant solution is low in its organic content, to utilize this concentrate for the making of a fresh batch of resin by using it to replace an equivalent weight of "amino KAR." Where the water extract contains a substantial quantity of inorganic salts (e. g. sodium phosphate derived from the ketone-aldehyde condensation products used in making "amino KAR"), the salt may be isolated merely by allowing it to crystallize out of the concentrate on standing, leaving behind a mother liquor suitable for use in making a new lot of resin. When such inorganic salts are present in the primary resin, it will be apparent that a subsidiary advantage involved in the water washing procedure is to reduce the amount of ionizable material in the infusible resin and to thereby improve its electrical properties.

One of the unexpected characteristics of the resins of the present invention, and a distinguishing factor over the primary resin, is that they are substantially infusible; they tend to decompose before they are appreciably fluxed down. As a result, they can be molded under the influence of heat and pressure without the necessity of including any fillers. It must be borne in mind that the resins of the present invention are only relatively infusible and water insoluble, and are still soluble in a variety of media, and that they can, when subjected to the action of appropriate temperatures for sufficient periods of time, and with the addition of curing or hardening agents where necessary, become thermoset to the thermorigid and wholly infusible and insoluble state.

After drying, the resins of the present invention are all possessed of a tan-brown color. An important feature is that they are possessed of a markedly superior resistance to a wide variety of chemical solvents which either dissolve or disintegrate the primary resins. Moreover, the resins of the present invention are possessed of a higher than usual coefficient of friction and this fact, combined with their substantially infusible nature, admirably adapts them to the manufacture of friction elements.

The addition to the novel resins of the present invention of various co-agents permits the production of resins having closely controllable molding and solubility characteristics, thus extending the usefulness of the resins of the present invention by permitting the use of these resins in applications for which the primary resins are not suited. Moreover, by including with the resins of the present invention a comparatively small quantity of a solvent or a softening agent, the resins of the present invention may be adapted to the production of molding compounds including fillers. If a high speed of curing is desired, an appropriate curing agent or activator may be added to the water leached resins.

With respect to the resins of the present invention fusible organic compounds may be conveniently arranged in three classes, to wit: (A) materials which show little if any compatibility with the resins of the present invention; (B) compounds which serve to soften the resins of the present invention—probably owing to a slight solvent action of the material upon the resin; (C) materials which function in the capacity of solvents for the resins of the present invention. Not infrequently the solvent characteristics become apparent only at elevated temperatures. It is interesting to note that the removal of the water-solubles from the primary resins has the effect of greatly diminishing the number of compounds capable of exerting an appreciable solvent effect. (Apparently the water-soluble components act in the nature of a coupling agent between the resin proper and certain of the solvent materials.) Most materials which exert a softening effect upon the resins of the present invention function as fairly effective solvents for the primary resins. Various of the materials with which the products of the present invention are substantially incompatible, function in the capacity either of softening agents or as solvents for the primary resins.

To list the behavior with the resins of the present invention of a substantial percentage of known compounds is beyond the scope of this specification. However, to enable the user to utilize the inventions of the present invention to best advantage there is presented below a listing of the behavior of representative compounds of a type familiar to those versed in the resin art. For convenience the compounds have been divided into three classes, viz: Class A, this class comprises organic compounds which are possessed of but little, if any, compatibility with the resins of the present invention—they may be looked upon as non-solvents for the resins of the present invention; Class B, this class comprises the organic compounds whose behavior towards the resins of the present invention is intermediate between the compounds of classes A and C—compounds belonging to this class are generally somewhat compatible with or soluble in the resins of the present invention and as such are characterized in functioning in the capacity of good "softening" agents for these resins; Class C, this class comprises organic compounds which are highly compatible and generally function in the capacity of good solvents for the resins of the present invention (usually heat is required to effect ready solution):

Class A

AFR acetate
formaldehyde aniline
AFR formal
AFR butyral
sorbitol
polyglycerol
ethyl acetate
butyl acetate
triethyl citrate
succrose octa acetate
butyl stearate
butyl riccinoleate
rosin
tricresyl phosphate
triphenyl phosphate
octanol
decanol
tetradecanol
triphenyl guanidine
diorthtoluyl guanidine
butyl phthalate
butyl glycolate
ethyl phthalate
ethyl glycolate
methyl phthalate
methyl glycolate
dibutyl sebacate
dibenzyl sebacate
benzol trichloride
paraffin wax
chlorinated naphthaline
aromatic hydrocarbons
aliphatic hydrocarbons
ethylene dichloride
dichlor ethylene
ethyl ether
isopropyl ether
water
cyclohexyl levullinate
higher fatty acid nitriles
dibutyl benzoate
butyl oleate
amyl stearate
diphenyl phthalate
chlorbenzene
vinyl acetate
styrene
turpentine
acrylonitrile
castor oil Class B furfuracetone
alphanitronaphthalene
betanitronaphthalene
carbosota
chlorinated diphenyls
orthonitro diphenyl
orthoamino diphenyl
methyl lactate
ethyl lactate
isopropyl lactate
butyl lactate
methyl tartrate
ethyl tartrate
butyl tartrate
crotonic aldehyde
methyl cellosolve lactate
ethyl cellosolve lactate
ethyl hydroxy acetate
butyl hydroxy acetate
methyl cellosolve hydroxy acetate
tetra glycol trichloride
partially acetylated AFR
AFR hydroxy acetate Class C aniline
toluidine
xylidine
monoethanolamines
triethanolamines
ethyl furfurylidine amine
diphenyl guanidine
ethylene diamine
diethylenetriamine
triethylene tetramine
tetraethylenepentamine
furfuramid
amino phenols
phenol
cresol
xylenol
cresylic acid
high boiling cresylic acid
butyl phenol
nitro phenol
beta naphthol
alpha naphthol
phenol-formaldehyde liquid resin
furfural
benzaldehyde
formic acid
acetic acid
propionic acid
chloroacetic acid
hydroxy acetic acid
glycolic acid
acrylic acid
methacrylic acid
oleic acid
maleic anhydride
benzoic anhydride
levulinic acid
salicylic acids
phthalic anhydride
sebacic acid
furfuryl alcohol
AFR
ethylene glycol
diethylene glycol
tetraethylene glycol
2-ethyl hexane diol-1-3
glycerol
tetrahydrylfurfuryl alcohol
benzyl alcohol
cyclohexanol
ethylene chlorhydrin
terpene hydrate
methyl cellosolve
ethyl cellosolve
hydroxy acetic acids
cellosolve hydroxy acetates
toluene ethyl sulfonamide
toluene sulfonamide A study of the above table reveals that among the solvents for the resins of the present invention are some that are water soluble and others that are insoluble in water. It thus becomes possible to replace the water solubles that were leached out in the washing operation with water insoluble materials, such as aniline, benzaldehyde, beta-naphthol, benzyl alcohol, etc. In this way it is possible to procure plasticized or "high flow" compositions substantially free of water soluble compounds—of interest in the production of ultimate cured articles possessed of a high degree of water resistance (low moisture absorption).

It will be observed that many of the materials that exert a solvent effect upon the resins of the present invention are also potent solvents for a wide variety of other resinous materials and in this wise it becomes possible, through judicious selection, to blend the resins of the present invention with other resins utilizing a common solvent as coupling agent, a circumstance which greatly increases the field of usefulness of the resins of the present invention.

The resins of the present invention are of particular interest when used in combination with appropriate polyvinyl hydroxy acetates in conjunction with a suitable coupling solvent such as benzyl alcohol, phenols, etc. It has been discovered that a chemical reaction occurs between the two resins, resulting in the production of strong, tough products that are substantially infusible and insolube.

The resins of the present invention may be milled into synthetic rubbers, particularly those of the neoprene and the butadiene-acrylonitrile copolymer types. The resins of the present invention are suitable for use in the manufacture of molding resins, anionic exchange resins, adhesives, and as modifiers for other resins. Specific products of the present invention are well suited to manufacture of brake linings, clutch facings, abrasive articles, for use as core binders, molding compositions, laminated compositions, printing mats and plates, paints, varnishes, enamels and protective coatings in general.

The following examples are illustrative of the various method of preparation of the resins of the present invention.

Example 1

This example is typical of the one-step process in which the basic resin is water washed during its formation. Five hundred and twenty pounds of "amino AFR," that is to say, AFR of the type disclosed in Patent No. 2,191,802 which had been reacted with one and one-half times its own weight of concentrated aqueous ammonia according to the process set forth in said copending application Serial No. 22,726, were charged into a kettle provided with a stirrer and facilitates for heating and containing 202 pounds of potentially reactive phenolformaldehyde liquid resin. Heat was applied and the mixture was stirred. After about an hour and one-half, 33 lbs. of chlorinated paraffin (with a chlorine content of 70%) were added, followed in a few moments by the addition of 15 pounds of furfuramid. Ten minutes later 33 additional pounds of the chlorinated paraffin and 16 pounds of furfuramid were added. 100 litre of water were now slowly run in and, after stirring for about a half hour (temperature inside kettle was now 190° F.), the stirring was stopped and the aqueous layer that had separated was siphoned off. Then 660 mil of pine oil were added to minimize frothing and foaming. The heat was maintained in the neighborhood of 193° F. for an additional hour during which time a 10 in. vacuum was applied for the purpose of permitting the ready volatiles to distill off. 1800 mil of tall oil were then added as lubricant and, after mixing in, the resin was removed from the kettle. The resin was dark brown in color, almost infusible, and contained but a small quantity of water extractibles. The resin was well suited for use in the preparation of molding compounds. What fusibility the resin possessed was largely owing to the presence of the plasticizers present.

In the foregoing example the resin was in a phase separate and distinct from the aqueous layer, which latter extracted substantial quantities of water solubles from the resinous mass. The resultant resin is inclined to contain small quantities of water and it is sometimes necessary to grind up the resin and to dry it out in an oven to assure the complete removal of moisture. Because resins of this type are possessed of a very high viscosity (in spite of the presence of plasticizers which function as fluxing agents) some difficulty is encountered in removing the resin from the reaction kettle. Many of these difficulties are alleviated or eliminated by the procedure set forth in the ensuing example.

Example 2

260 lbs. of "amino AFR" and 100 lbs. of a potentially reactive phenol-formaldehyde condensation product were charged into a reaction kettle provided with a stirrer and facilities for heating. Heat was applied to the kettle and the mixture was well stirred. After a half hour 33 lbs. of chlorinated paraffin (with a chlorine content of 70%) were introduced along with 15 lbs. of furfuramid. Ten minutes later another 33 lbs. of chlorinated paraffin and 16 lbs. of furfuramid were added. Five minutes later 400 litre of water containing 6 lbs. of gum arabic were introduced into the kettle. The mixture was heated and stirred for a period of approximately one hour at the end of which time the kettle contents were run through a filter (a centrifuge may be used) to separate the resin (which was in a rather finely divided state) from the aqueous phase. The 413 lbs. of moist resin were then spread out in trays and dried in a forced draft circulating air oven maintained at a temperature of about 120° F. The resultant resin had a tan-brown color and was possessed of a high melting point. The resin contained a very low content of water extractibles. The resin was well suited for applications where a high resistance toward water is called for. As in the instance of the product of the previous example, here too, the use of plasticizers is highly advantageous so as to permit the resin to flow out of the kettle.

Example 3

In the two-step process, the basic resin is first formed and the water soluble constituents thereof are then removed in a separate step. For example, a potentially reactive liquid phenol-formaldehyde resin was first prepared by reacting 40.6 lbs. of phenol with 51.9 lbs. of formaldehyde utilizing 1800 mil of 8 normal sodium hydroxide as catalyst. After reaction the product concentrated to a net weight of approximately 67.5 lbs. 30 lbs. of the above potentially reactive liquid phenol-formaldehyde resin were placed into a jacketed reaction kettle provided with a stirrer and facilities for heating and vacuum distillation. 68 lbs. of "amino AFR" along with 200 mil of 4/normal sodium hydroxide were then added and the mixture was warmed and stirred to uniformity. The heating and stirring were continued and a few minutes later vacuum was cautiously applied. It was found advantageous to maintain a steam pressure of about 3 lbs. in the jacket. After heating for about an hour and a half the bulk of the volatiles were eliminated. In the present example 10 lbs. of chlorinated paraffin (chlorine content approximately 70%) along with about 5 lbs. of furfuramid were added in four equal portions over a period of about 20 minutes. (A lubricant such as 10 oz. of tall oil may advantageously be incorporated into the mass at this time.) After stirring for an additional 15 to 20 minutes the resinous mass was in a satisfactorily grindably hard state (as determined by cooling a sample to room temperature) and as soon as this end point was reached the resin was removed from the kettle. (Frothing and foaming which occurs during the vacuum distillation step may be minimized through the addition of small quantities of materials such as pine oil, alpha terpineol or other anti-foaming agents.) The resultant primary resin was dark brown in color, grindably hard, readily fusible, soluble in appropriate media and could be thermoset to the thermorigid insoluble, infusible "C" stage upon the application of heat or heat and pressure.

This grindably hard resin was crushed and finely ground. 100 parts by weight of the finely ground resin were agitated with 200 parts by weight of water for a period of about a half hour. The mixture was then filtered (or centrifuged) so as to remove the watery solution from the residual resin. The residual resin was again agitated with 200 parts of water and then subjected to filtration. The resultant residual resin was once again extracted with 200 parts of water for the purpose of removing further quantities of water soluble materials. The mixture was again filtered so as to remove the watery phase from the residual resin. The residual resin, which was in the form of a damp loose powder, was then placed upon a tray and dried in a circulating air oven at a temperature of in the neighborhood of 140° F.

The resultant dried resin was possessed of a tan brown color and differed in many respects from the primary resin from which it was derived. Whereas the original resin was readily fusible upon the hot plate (200° F.) the water washed resin of the present example showed no signs of fusing even at 350° F. This, however, is not to say that the resin of the present example is infusible or in the "C" stage, for it can readily be shown to be soluble in appropriate media. The resin of the present example, per se, is wholly unsuited for the manufacture of molding compounds based upon the use of woodflour, asbestos, etc. as fillers, in marked contrast to the primary resin from which it is derived. This unsuitability can be traced to the fact that in the process of water extraction the low melting plasticizing components have been removed. On the other hand, if the water extracted components be replaced with a more or less equivalent weight of one of the previous listed materials that functions as a solvent for the resin, then excellent results can be procured. Because of the wide range of solvents (plasticizers) that may be utilized it is possible to produce an endless number of variations as regards the properties of the ultimate molding composition. While the resin of the present example is substantially infusible, through the use of appropriate quantities of selected compounds (as through the use of substances indicated above as having a definite softening effect upon the resin) it is possible to procure compositions made solely out of resin plus the alluded to modifier without the inclusion of any fillers. Such unfilled molding compositions are of interest for a variety of applications and are particularly interesting because of the relatively great difficulty encountered in producing unfilled thermosetting resinous molding compositions out of the usual types of phenolic or aminoplastic resin. The resins of the present example are also useful for the purpose of elevating the softening point of certain thermoplastic resins, e. g., polyvinyl acetate and alcohol.

Example 4

This example depicts the counter-current leaching of the resin. The process is set in motion by subjecting 100 parts by weight of the primary resin of Example 3 (for convenience designated as $R_x$) to the action of 200 parts by weight of water ($W_0$), followed by filtering or centrifuging to separate the aqueous liquor from the residual resin. The foregoing lost of residual resin is designated as $E_aR_x$ while the washed liquor is desiganted as $W_1$. Then a fresh lot of 100 parts of the primary resin ($R_x$) is leached with the $W_1$ liquor and the resultant residual resin is designated as $E_1R_x$ while the extract is designated as $W_2$. The partially extracted resin $E_1R_x$ is now extracted with 200 parts by weight of water ($W_0$) resulting in the production of residual resin $E_bR_x$ and wash liquor $W_1$. A fresh lot of 100 parts of the primary resin ($R_x$) is leached with wash liquor $W_2$ to yield residual resin $E_2R_x$ and wash liquor $W_3$. Partially extracted resin $E_2R_x$ is now leached with wash water $W_1$, resulting in the production of residual resin $E_1R_x$ and wash water $W_2$. Residual resin $E_1R_x$ is leached with 200 parts by weight of fresh water ($W_0$) to yield residual resin $E_0R_x$ and wash water $W_1$. The preliminary operations have now been run through once and it is to be observed that at this point of the overall operation one ends up with batches of wash water $W_3$, $W_2$, and $W_1$ and that one has on hand residual resins designated $E_2R_x$, $E_1R_x$, and $E_0R_x$. All wash liquors of the $W_3$ type are removed from the system either for discard or for further processing or reclamation of the solids. All residual resins of the $E_0R_x$ type are considered completed as far as the leaching operation is concerned and this residual resin may now be dried, or otherwise further processed.

Having thus set the system in motion, one is now in a position to continue with the counter-current leaching operation. For this purpose one starts out with 100 parts by weight of a fresh lot of primary resin ($R_x$) and first subjects the same to a leaching operation with a wash liquor of the $W_2$ type resulting in the production of partially leached residual resin $E_2R_x$ and wash water $W_3$, which latter is removed from the system as aforeindicated. The partially leached resin $E_2R_x$ is then leached with wash liquor $W_1$ to yield partially leached resin $E_1R_x$ and wash liquor $W_2$. Partially leached resin $E_1R_x$ is now finally leached with 200 parts by weight of fresh water ($W_0$) to yield residual resin $E_0R_x$ and wash liquor $W_1$. This sequence of operations is then repeated over and over again. It will be noted that once in operation there is put into the system fresh resin and water and that there comes out of the system triple extracted resin ($E_0R_x$) which may be dried or otherwise processed, together with wash liquors of the $W_3$ type which are removed from the system and either discarded or further processed. Wash liquors of the $W_1$ and $W_2$ type remain "in process" while partially extracted resin designated as $E_2R_x$ and $E_1R_x$ represent intermediate stages in the leaching operation. Partially extracted resins $E_aR_x$ and $E_bR_x$, procured in the operation of setting the process in motion, can conveniently be worked off by placing them into the process as though they were original primary resins of the $E_x$ type even though they have already been partially extracted.

The foregoing counter-current procedure is highly efficient as regards the quantity of water utilized per unit weight of resin. The process has the further advantage in that it may readily be rendered continuous and automatic via the use of conventional equipment.

Example 5

This example is similar to foregoing Example 3 and differs therefrom only in that the leaching was carried out at a temperature of 120° F. Aside from the fact that the amount of material extracted out of the resin was slightly greater, there was no material difference between the products of the two examples.

Example 6

In Example 3, if a specifically different primary resin is employed, somewhat different results are obtained. Thus, the primary resin may be produced by adding 13 parts by weight of "amino AFR" to 7 parts by weight of a liquid potentially reactive phenol-formaldehyde resinous condensation product (prepared by reacting 3.6 parts by weight of phenol with 6.15 parts by weight of 37% aqueous formaldehyde in the presence of a small quantity of sodium hydroxide solution as catalyst, and then concentrating to a net weight of 7 parts), and stirring the mixture and heating it under a vacuum so as to effect the necessary reaction and the removal of ready volatiles until a grindably hard resin has come into being (in a kettle with a jacket temperature of in the neighborhood of 200° F., this requires approximately two hours). If such a resin is treated according to Example 3, a greater amount of material will be extracted than was the case when the basic resin of Example 3 was employed. This is probably attributable to the fact that the basic resin of Example 3 contains substantial quantities of materials that are not appreciably soluble in water (the chlorinated paraffin and the furfuramids). This procedure is disadvantageous in that it requires a special type of kettle to permit of the ready removal of the resin owing to its substantially infusible character.

It will be noted that in the foregoing examples "amino AFR" has been the nitrogenous base from which the resins are produced. The present invention is by no means limited to this particular type of "amino KAR," even though for most applications it appears that "amino AFR" is much the preferred compound. Thus, the reaction product of ethyl methyl ketone formaldehyde and ammonia may be employed as the "amino KAR."

The advantages and properties of the substantially infusible nitrogenous resins of the present invention and various methods for their production and modification have already been pointed out. It will be apparent that many variations may be made therein without departing from the spirit of the invention as defined in the following claims.

I claim:

1. A substantially infusible and substantially water insoluble nitrogenous resin comprising the water-leached reaction product obtained from a mixture of a potentially reactive phenol-aldehyde condensation product and a fusible, soluble, substantially non-resinous and substantially non-volatile reactive amine resulting from the reaction between a ketone-aldehyde condensation product and a nitrogenous base, said ketone-aldehyde condensation product being selected from the class consisting of the fusible, soluble, substantially non-resinous and substantially non-volatile reactive condensation products produced by reacting a ketone having the general formula $CH_3-CO-R_1$, wherein $R_1$ represents an aliphatic hydrocarbon radical having from one to four carbon atoms, with an aldehyde having the general formula $R_2-CHO$, wherein $R_2$ represents a member selected from the group consisting of hydrogen and aliphatic hydrocarbon radicals having from one to four carbon atoms, said nitrogenous base being a member of the group consisting of ammonia, primary and secondary amines, and tetra-alkyl ammonium bases which can break down to yield primary or secondary amines, possessing an ionization constant of not less than $1 \times 10^{-8}$, and containing at least one reactive hydrogen atom attached to a basic nitrogen atom, said mixture being reacted by heating it until a readily fusible resin is formed, and, through the use of water, leaching out the water-soluble components.

2. A substantially infusible and substantially water insoluble nitrogenous resin comprising the water-leached reaction product obtained from a mixture of a potentially reactive phenol-aldehyde condensation product and a fusible, soluble, substantially non-resinous and substantially non-volatile reactive amine resulting from the reaction between a ketone-aldehyde condensation product and a nitrogenous base, said ketone-aldehyde condensation product being selected from the class consisting of the fusible, soluble, substantially non-resinous and substantially non-volatile reactive condensation products produced by reacting a ketone having the general formula $CH_3-CO-R_1$, wherein $R_1$ represents an aliphatic hydrocarbon radical having from one to four carbon atoms, with an aldehyde having the general formula $R_2-CHO$, wherein $R_2$ represents a member selected from the group consisting of hydrogen and aliphatic hydrocarbon radicals having from one to four carbon atoms, said nitrogenous base being a member of the group consisting of ammonia, primary and secondary amines, and tetra-alkyl ammonium bases which can break down to yield primary or secondary amines, possessing an ionization constant of not less than $1 \times 10^{-8}$, and containing at least one reactive hydrogen atom attached to a basic nitrogen atom, said mixture being reacted by heating it until a readily fusible resin is formed, said resin being pulverized and then, through the use of water, leached so as to remove the water-soluble components therefrom.

3. A substantially infusible and substantially water insoluble nitrogenous resin comprising the water leached reaction product obtained from a mixture of a potentially reactive phenol-aldehyde condensation product and a fusible, soluble, substantially non-resinous and substantially non-volatile reactive amine resulting from the reaction between a ketone-aldehyde condensation product and a nitrogenous base, said ketone-aldehyde condensation product being selected from the class consisting of the fusible, soluble, substantially non-resinous and substantially non-volatile reactive condensation products produced by reacting a ketone having the general formula $CH_3-CO-R_1$, wherein $R_1$ represents an aliphatic hydrocarbon radical having from one to four carbon atoms, with an aldehyde having the general formula $R_2-CHO$, wherein $R_2$ represents a member selected from the group consisting of hydrogen and aliphatic hydrocarbon radicals having from one to four carbon atoms, said nitrogenous base being a member of the group consisting of ammonia, primary and secondary amines, and tetra-alkyl ammonium bases which can break down to yield primary or secondary amines, possessing an ionization constant of not less than $1 \times 10^{-8}$, and containing at least one reactive hydrogen atom attached to a basic nitrogen atom, said mixture being reacted by heating it in the presence of water until a readily fusible resin is formed, the substantially water-insoluble resinous mass which constitutes the reaction product being then separated from the aqueous solution, which latter consists of water together with the water-soluble components that have been extracted from the resinous mass.

4. A substantially infusible and substantially water insoluble nitrogenous resin comprising the water-leached reaction product obtained from a mixture of a potentially reactive phenol-formaldehyde condensation product and a fusible, soluble, substantially non-resinous and substantially non-volatile reactive amine resulting from the reaction between fusible, soluble, substantially non-resinous and substantially non-volatile reactive acetone-formaldehyde condensation products with ammonia, said mixture being reacted by heating it until a readily fusible resin is formed, and, through the use of water, leaching out the water-soluble components.

5. The cured product of the resin of claim 1 and a water insoluble plasticizer, said cured product having a high degree of water resistance.

6. The cured product of the resin of claim 4 and a water insoluble plasticizer, said cured product having a high degree of water resistance.

7. The method of producing a substantially infusible and substantially water insoluble nitrogenous resin which comprises forming a mixture of a potentially reactive phenol-aldehyde condensation product and a fusible, soluble, substantially non-resinous and substantially non-volatile reactive amine resulting from the reaction between a ketone-aldehyde condensation product and a nitrogenous base, said ketone-aldehyde condensation product being selected from the class consisting of the fusible, soluble, substantially non-resinous and substantially non-volatile reactive condensation products produced by reacting a ketone having the general formula $CH_3—CO—R_1$, wherein $R_1$ represents an aliphatic hydrocarbon radical having from one to four carbon atoms, with an aldehyde having the general formula $R_2—CHO$, wherein $R_2$ represents a member selected from the group consisting of hydrogen and aliphatic hydrocarbon radicals having from one to four carbon atoms, said nitrogenous base being a member of the group consisting of ammonia, primary and secondary amines, and tetra-alkyl ammonium bases which can break down to yield primary or secondary amines, possessing an ionization constant of not less than $1 \times 10^{-8}$, and containing at least one reactive hydrogen atom attached to a basic nitrogen atom, reacting said mixture by heating it until a readily fusible resin is formed, and, through the use of water, leaching out the water-soluble components.

8. The method of producing a substantially infusible and substantially water insoluble nitrogenous resin which comprises forming a mixture of a potentially reactive phenol-formaldehyde condensation product and a fusible, soluble, substantially non-resinous and substantially non-volatile reactive amine resulting from the reaction between fusible, soluble, substantially non-resinous and substantially non-volatile reactive acetone-formaldehyde condensation products and ammonia, reacting said mixture by heating it until a readily fusible resin is formed, and, through the use of water, leaching out the water soluble components.

9. The method of producing a substantially infusible and substantially water insoluble nitrogenous resin which comprises forming a mixture of a potentially reactive phenol-formaldehyde condensation product and a fusible, soluble, substantially non-resinous and substantially non-volatile reactive amine resulting from the reaction between fusible, soluble, substantially non-resinous and substantially non-volatile reactive acetone-formaldehyde condensation products and ammonia, and reacting said mixture in the presence of water until a readily fusible resin is formed, and separating the substantially water-insoluble resinous mass from the aqueous solution, which latter consists of water together with the water-soluble components that had been extracted from the resinous mass.

10. The method of producing a substantially infusible and substantially water insoluble nitrogenous resin which comprises forming a mixture of a potentially reactive phenol-aldehyde condensation product with a fusible, soluble, substantially non-resinous and substantially non-volatile reactive amine resulting from the reaction between a ketone-aldehyde condensation product and a nitrogenous base, said ketone-aldehyde condensation product being selected from the class consisting of the fusible, soluble, substantially non-resinous and substantially non-volatile reactive condensation products produced by reacting a ketone having the general formula $CH_3—CO—R_1$, wherein $R_1$ represents an aliphatic hydrocarbon radical having from one to four carbon atoms, with an aldehyde having the general formula $R_2—CHO$, wherein $R_2$ represents a member selected from the group consisting of hydrogen and aliphatic hydrocarbon radicals having from one to four carbon atoms, said nitrogenous base being a member of the group consisting of ammonia, primary and secondary amines, and tetra-alkyl ammonium bases which can break down to yield primary or secondary amines, possessing an ionization constant of not less than $1 \times 10^{-8}$, and containing at least one reactive hydrogen atom attached to a basic nitrogen atom, reacting said mixture by heating it in the presence of water until a readily fusible resin is formed, and separating the substantially water-insoluble resinous mass from the aqueous solution, which latter consists of water together with the water-soluble components that have been extracted from the resinous mass.

11. The method of producing a substantially infusible and substantially water insoluble nitrogenous resin which comprises forming a mixture of potentially reactive phenol-aldehyde condensation product with a fusible, soluble, substantially non-resinous and substantially non-volatile reactive amine resulting from the reaction between a ketone-aldehyde condensation product and a nitrogenous base, said ketone-aldehyde condensation product being selected from the class consisting of the fusible, soluble, substantially non-resinous and substantially non-volatile reactive condensation products produced by reacting a ketone having the general formula $CH_3—CO—R_1$, wherein $R_1$ represents an aliphatic hydrocarbon radical having from one to four carbon atoms, with an aldehyde having the general formula $R_2—CHO$, wherein $R_2$ represents a member selected from the group consisting of hydrogen and aliphatic hydrocarbon radicals having from one to four carbon atoms, said nitrogenous base being a member of the group consisting of ammonia, primary and secondary amines, and tetra-alkyl ammonium bases which can break down to yield primary or secondary amines, possessing an ionization constant of not less than $1 \times 10^{-8}$, and containing at least one reactive hydrogen atom attached to a basic nitrogen atom, reacting said mixture by heating it until a readily fusible resin is formed, pulverizing said readily fusible resin and then, through the use of water, leaching out the water-soluble components.

12. The method of producing a cured nitrogenous resin having a high degree of water resistance which comprises carrying out the method of claim 10, adding a water insoluble plasticizer to the resultant resin, and curing the mixture.

GEORGE KARL VOGELSANG.

REFERENCES CITED

The following references are of record in the file of this patent:

UNITED STATES PATENTS

| Number | Name | Date |
| --- | --- | --- |
| 2,191,802 | Novotny | Feb. 27, 1940 |